US011986928B2

(12) United States Patent
Ross

(10) Patent No.: US 11,986,928 B2
(45) Date of Patent: May 21, 2024

(54) PAWL MECHANISM FOR RATCHET TOOL

(71) Applicant: Snap-on Incorporated, Kenosha, WI (US)

(72) Inventor: David T. Ross, Antioch, IL (US)

(73) Assignee: Snap-on Incorporated, Kenosha, WI (US)

( * ) Notice: Subject to any disclaimer, the term of this patent is extended or adjusted under 35 U.S.C. 154(b) by 62 days.

(21) Appl. No.: 17/720,918

(22) Filed: Apr. 14, 2022

(65) Prior Publication Data

US 2023/0330819 A1 Oct. 19, 2023

(51) Int. Cl.
*B25B 13/46* (2006.01)

(52) U.S. Cl.
CPC .................................. *B25B 13/463* (2013.01)

(58) Field of Classification Search
CPC ..... B25B 13/463; B25B 13/46; B25B 13/461; B25B 13/462
See application file for complete search history.

(56) References Cited

U.S. PATENT DOCUMENTS 2,193,984 A * 3/1940 Rhinevault ........... B25B 13/463 81/63.1
2,978,081 A 4/1961 Lundin et al.
5,148,726 A 9/1992 Huebschen et al.
5,174,176 A 12/1992 Krivec
5,178,047 A 1/1993 Arnold et al.
5,522,288 A 6/1996 Slusar et al.
5,771,760 A * 6/1998 Tiede ...................... B25B 15/04 81/62
5,782,147 A 7/1998 Chaconas et al.
5,857,390 A 1/1999 Whiteford
5,887,493 A 3/1999 Main
6,059,898 A 5/2000 Fisher et al.
6,109,141 A 8/2000 Nurmi (Continued)

FOREIGN PATENT DOCUMENTS

AU 2022200456 A1 8/2022
CA 2862187 C 5/2015

(Continued)

OTHER PUBLICATIONS

Taiwan Office Action for corresponding Application No. 1121142150 dated Nov. 22, 2022, 17 pages.

(Continued)

*Primary Examiner* — Thomas C Diaz
(74) *Attorney, Agent, or Firm* — Seyfarth Shaw LLP

(57) ABSTRACT

The present invention relates broadly to pawl mechanism for a tool, such as a ratchet wrench. The pawl mechanism includes first and second pawls that are selectively engageable with a drive gear to provide first and second rotational drive directions. Each of the first and second pawls includes an outwardly protruding hook type projections that engage respective recesses or grooves in a pawl carrier to operably couple the pawl carrier to the first and second pawls. The pawl carrier includes first and second pawl pockets that receive the respective first and second pawls. The pawl carrier also includes first and second recesses or grooves proximate to the respective first and second pawl pockets, and that receive the hook type projections.

12 Claims, 2 Drawing Sheets

(56) References Cited

U.S. PATENT DOCUMENTS

| | | | | |
|---|---|---|---|---|
| 6,279,428 | B1 * | 8/2001 | Huang | B25B 13/463 81/63.1 |
| 6,622,570 | B1 | 9/2003 | Prevey, III | |
| 6,868,759 | B2 | 3/2005 | Tuan-Mu et al. | |
| 6,964,216 | B2 | 11/2005 | Chen | |
| 7,207,244 | B2 | 4/2007 | Chen | |
| 7,587,961 | B1 | 9/2009 | Chiang | |
| 7,895,922 | B2 | 3/2011 | Hung | |
| 7,975,574 | B2 | 7/2011 | Hu | |
| 8,495,931 | B2 | 7/2013 | Sroka | |
| 8,499,666 | B2 * | 8/2013 | Hopper | B25B 13/463 81/63.1 |
| 8,516,928 | B2 | 8/2013 | Hu | |
| RE44,655 | E | 12/2013 | Ross et al. | |
| 8,720,308 | B2 | 5/2014 | Hopper et al. | |
| 9,038,507 | B2 | 5/2015 | Thompson et al. | |
| 9,079,299 | B2 * | 7/2015 | Wu | B25B 13/463 |
| 9,364,940 | B2 | 6/2016 | Wu | |
| 9,707,668 | B2 | 7/2017 | Wu | |
| 9,709,141 | B2 | 7/2017 | Thompson et al. | |
| 10,016,880 | B2 | 7/2018 | Chung | |
| 10,029,353 | B2 | 7/2018 | Hsieh et al. | |
| 10,118,278 | B2 | 11/2018 | Thompson et al. | |
| 10,259,106 | B2 * | 4/2019 | Chung | B25B 13/463 |
| 10,464,191 | B2 | 11/2019 | Anderson et al. | |
| 10,682,744 | B2 | 6/2020 | Lee | |
| 10,870,186 | B2 * | 12/2020 | Ross | B25B 13/463 |
| 2005/0039511 | A1 | 2/2005 | Prevey et al. | |
| 2005/0173090 | A1 | 8/2005 | Ling | |
| 2008/0229887 | A1 | 9/2008 | Thompson et al. | |
| 2008/0229889 | A1 | 9/2008 | Hopper et al. | |
| 2010/0083795 | A1 | 4/2010 | Eggert | |
| 2011/0132149 | A1 | 6/2011 | Lee | |
| 2015/0059533 | A1 | 3/2015 | Huang | |
| 2015/0328749 | A1 | 11/2015 | Thompson et al. | |
| 2017/0050299 | A1 | 2/2017 | Hsieh | |
| 2017/0182637 | A1 | 6/2017 | Chen | |
| 2018/0272505 | A1 | 9/2018 | Ross | |
| 2019/0091839 | A1 | 3/2019 | Ross | |
| 2020/0189075 | A1 | 6/2020 | Thompson | |
| 2020/0189076 | A1 | 6/2020 | Xu et al. | |
| 2020/0269392 | A1 | 8/2020 | Thompson et al. | |

FOREIGN PATENT DOCUMENTS

| | | | |
|---|---|---|---|
| CA | 2890858 | C | 1/2018 |
| CA | 3010643 | A1 | 3/2019 |
| CN | 200963800 | Y | 10/2007 |
| CN | 203092440 | U | 7/2013 |
| CN | 111002228 | A | 4/2020 |
| DE | 202006013354 | | 11/2006 |
| DE | 102010004837 | A1 | 7/2011 |
| DE | 202016103335 | | 9/2016 |
| DE | 102017120094 | | 2/2019 |
| DE | 202020101372 | U1 | 4/2020 |
| EP | 1484135 | A1 | 8/2003 |
| EP | 2946884 | A1 | 11/2015 |
| GB | 820914 | | 9/1959 |
| GB | 2605497 | A | 10/2022 |
| TW | 483366 | U | 4/2002 |
| TW | M452834 | U | 5/2013 |
| TW | 201914764 | A | 4/2019 |
| TW | M588610 | U | 1/2020 |

OTHER PUBLICATIONS

Australian Examination Report No. 1 for corresponding AU Application No. 2022200456, dated Feb. 16, 2023, 4 pages.
Australian Examination Report No. 1 for corresponding AU Application No. 2022200294, dated Feb. 24, 2023, 4 pages.
Canadian Office Action for corresponding CA Application No. 3,147,480, dated Mar. 6, 2023, 5 pages.
Definition of Lateral found at: https://web.archive.org/web/20200512224207/https://www.merriam-webster.com/dictionary/lateral (Year: 2020).
Combined Search and Examination Report for corresponding Application No. GB2201243.9 dated Jul. 29, 2022, 7 pages.
Combined Search and Examination Report for corresponding Application No. GB2305126.1 dated Oct. 3, 2023, 7 pages.
Australian Examination Report No. 1 for corresponding AU Application No. 2023202113, dated Jan. 9, 2024, 5 pages.

* cited by examiner

PAWL MECHANISM FOR RATCHET TOOL

TECHNICAL FIELD

The present application relates generally to pawl mechanisms, and more particularly to pawl mechanisms for ratchet tools.

BACKGROUND

Many dual pawl mechanisms are known and used. Typically, these mechanisms are incorporated into tools, such as ratchet wrenches or the like, that have a drive portion engageable with, for example, a socket or fastener head. These tools typically allow for selection of first and second drive directions. For example, the first drive direction may be selected for the dual pawl mechanism so that use of the tool provides torque when engaged with the fastener head and rotated in a first direction while slipping or ratcheting when rotated in a second direction. The second drive direction may be selected for the dual pawl mechanism that is opposite the first drive direction, and that provides torque and slip in the opposite directions.

In operating the reversible dual pawl mechanism, there is typically a manually actuable portion, commonly referred to as a reversing lever, that effects the engagement of one pawl and the disengagement of a second pawl with a drive gear. The drive direction for the drive portion is dependent on which of the two pawls is engaged with the drive gear.

SUMMARY

The present invention relates broadly to pawl mechanism for a tool, such as a ratchet wrench. The pawl mechanism includes first and second pawls that are selectively engageable with a drive gear to provide first and second rotational drive directions. Each of the first and second pawls includes an outwardly protruding hook type projections that engage respective recesses or grooves in a pawl carrier to operably couple the pawl carrier to the first and second pawls. The pawl carrier includes first and second pawl pockets that receive the respective first and second pawls. The pawl carrier also includes first and second recesses or grooves proximate to the respective first and second pawl pockets, and that receive the hook type projections.

When the pawl carrier is rotated (via rotation of a reversing lever) to select the first rotational drive direction, the pawl carrier causes the first pawl to move into engagement with a drive gear, and pulls the second pawl away or out of engagement with the drive gear. Similarly, when the pawl carrier is rotated (via rotation of a reversing lever) to select the second rotational drive direction, the pawl carrier causes the second pawl to move into engagement with a drive gear, and pulls the first pawl away or out of engagement with the drive gear.

In an embodiment, the present invention relates to a pawl mechanism for a ratchet tool, wherein the ratchet tool includes a drive gear with gear teeth. The pawl mechanism includes a pawl carrier including a first pawl pocket and first groove, and a first pawl disposed in the first pawl pocket. The first pawl includes first pawl teeth selectively engageable with the gear teeth to select a first rotational drive direction, a first projection extending away from the first pawl teeth, and a first protrusion extending from the first projection and into the first groove.

In another embodiment, the present invention relates to a ratchet tool. The ratchet tool includes a ratchet head with a drive cavity and a pawl cavity, a drive gear with gear teeth disposed in the drive cavity, a pawl carrier disposed in the pawl cavity, and including first and second pawl pockets that face towards the drive gear, and first and second grooves. A reversing lever is coupled to the pawl carrier, and movable to select either of first and second rotational drive directions. A first pawl is disposed in the pawl cavity and in the first pawl pocket, and includes first pawl teeth selectively engageable with the gear teeth when the first rotational drive direction is selected. The first pawl includes a first projection extending away from the first pawl teeth, and a first protrusion extending from the first projection and into the first groove. A second pawl is disposed in the pawl cavity and in the second pawl pocket, and includes second pawl teeth selectively engageable with the gear teeth when the second rotational drive direction is selected. The second pawl also includes a second projection extending away from the second pawl teeth, and a second protrusion extending from the second projection and into the second groove.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
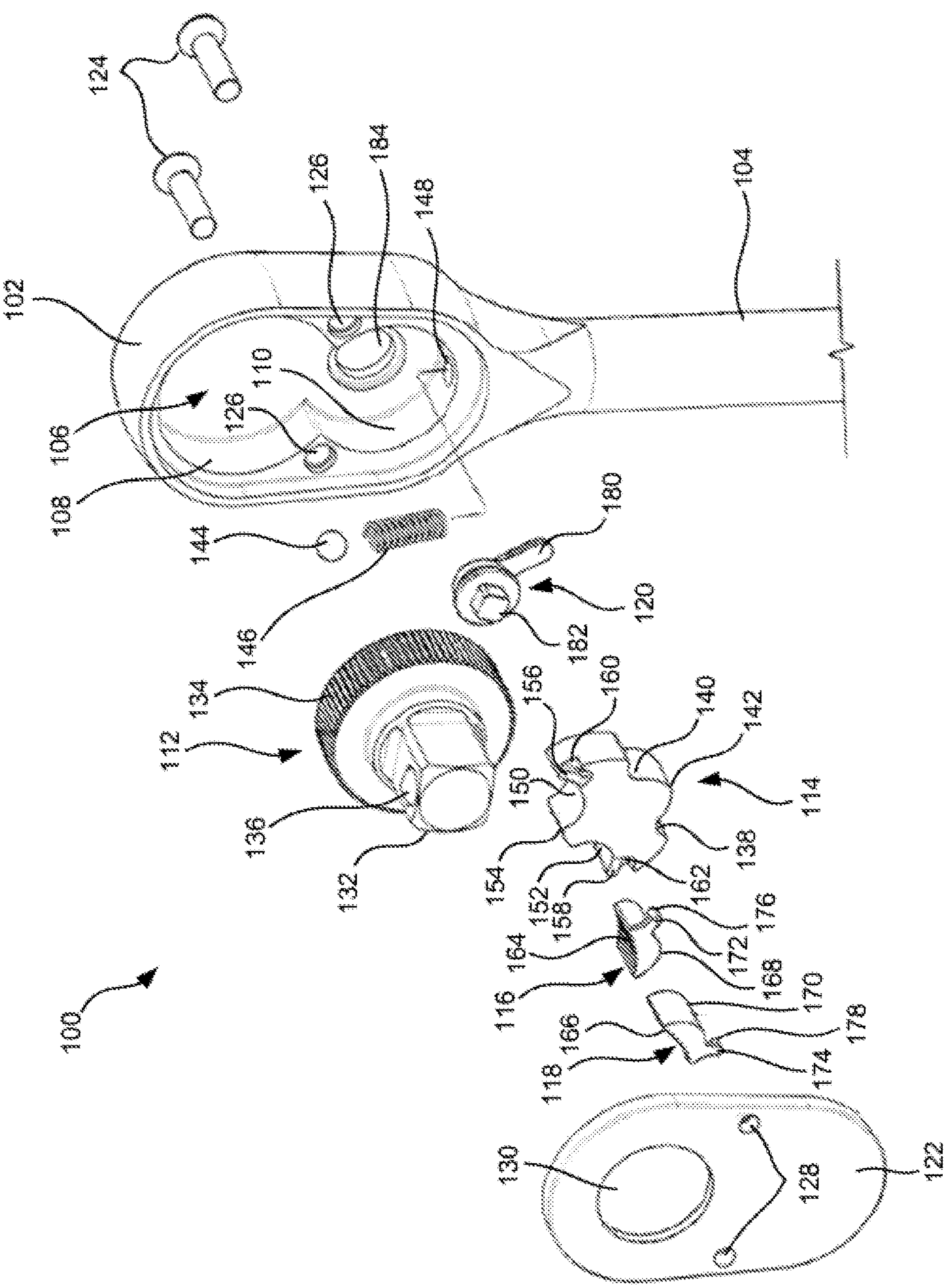
FIG. 1 is an exploded view of a ratchet tool, according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term “present invention” is not intended to limit the scope of the claimed invention and is instead a term used to discuss exemplary embodiments of the invention for explanatory purposes only.

The present invention relates broadly to pawl mechanism for a tool, such as a ratchet wrench. The pawl mechanism includes first and second pawls that are selectively engageable with a drive gear to provide first and second rotational drive directions. Each of the first and second pawls includes an outwardly protruding hook type projections that engage respective recesses or grooves in a pawl carrier to operably couple the pawl carrier to the first and second pawls. The pawl carrier includes first and second pawl pockets that receive the respective first and second pawls. The pawl carrier also includes first and second recesses or grooves proximate to the respective first and second pawl pockets, and that receive the hook type projections.

When the pawl carrier is rotated (via rotation of a reversing lever) to select the first rotational drive direction, the pawl carrier causes the first pawl to move into engagement with a drive gear, and pulls the second pawl away or out of engagement with the drive gear. Similarly, when the pawl carrier is rotated (via rotation of a reversing lever) to select the second rotational drive direction, the pawl carrier causes the second pawl to move into engagement with a drive gear, and pulls the first pawl away or out of engagement with the drive gear.

Figure 2:
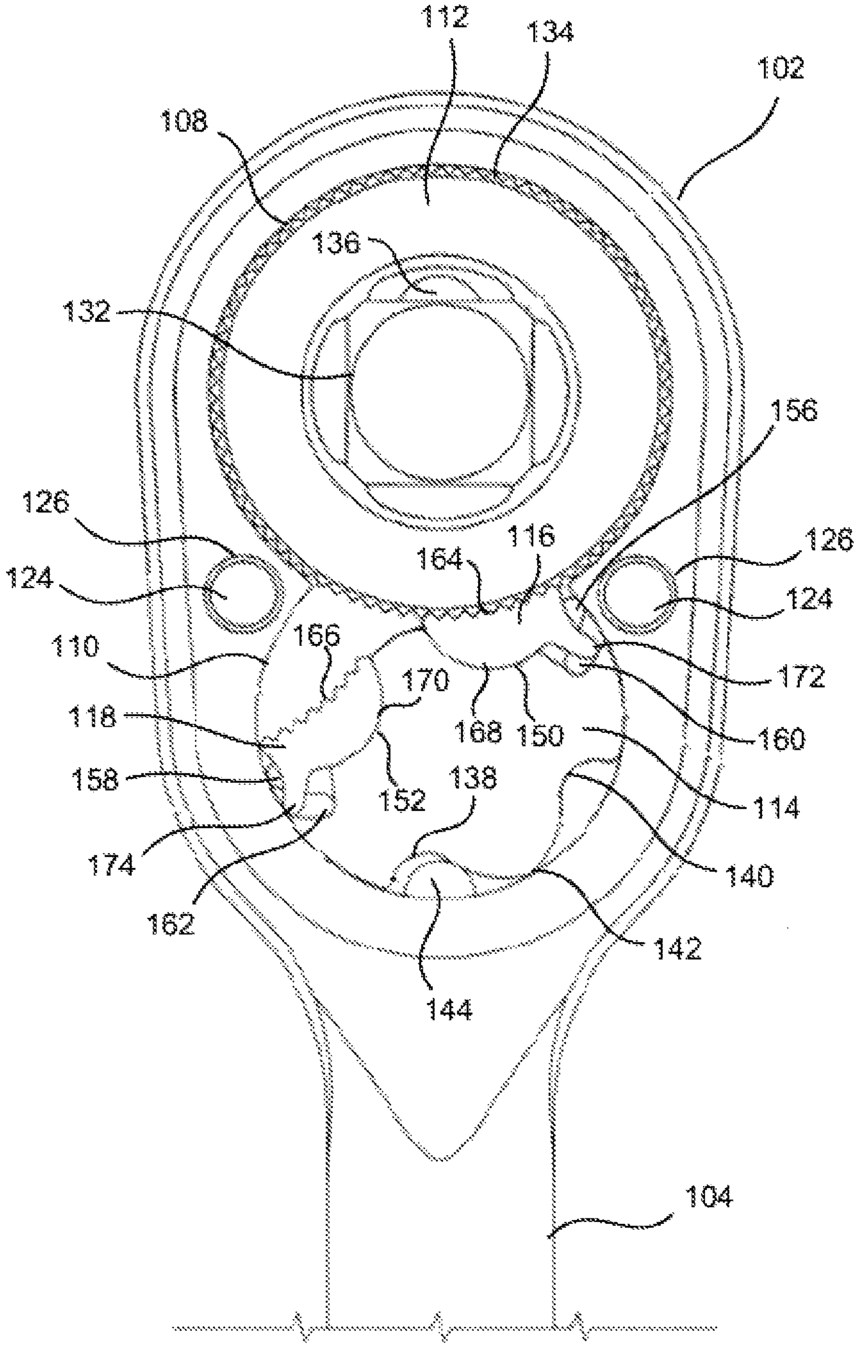
FIG. 2 is a side view of a head of the ratchet tool with a cover plate removed.

Referring to FIGS. 1 and 2, a tool 100, such as a ratchet wrench includes a head 102 and a handle 104 extending from the head 102. The head 102 includes a cavity 106 adapted to receive internal and external components of the tool 100 for providing torque to a working piece (not shown) such as a socket or other tool or a fastener. The internal and/or external components may include a drive gear 112, pawl carrier 114, first and second pawls 116, 118, respectively, a reversing lever 120, etc.

The cavity 106 may include several portions for receiving and retaining the components, such as first and second cavities 108, 110 that overlap or are in communication with each other. The first cavity 108, also referred to as a drive cavity 108, is adapted to receive the drive gear 112, and the second cavity 110 is adapted to receive a pawl mechanism, also referred to as a pawl cavity. For example, the second cavity 110 is adapted to receive the pawl carrier 114, and first and second pawls 116, 118. As mentioned above, the first and second cavities 108, 110 overlap or communicate to allow the first and second pawls 116, 118 to selectively move into and out of engagement with the drive gear 112.

When the components are assembled into the cavity 106 of the head 102, a cover plate 122 is coupled to the head 102 to cover or enclose the cavity 160, such as by fasteners 124 that extend through respective fastener apertures 126 in the head 102, and into fastener apertures 128 in the cover plate. The cover plate 122 also includes a circular bore 130 through which a drive post 132 of the drive gear 112 projects for operative engagement with a socket or work piece. The circular bore 130 may also define a bearing surface for the drive post 132 to retain and position the drive gear 112.

The drive gear 112 has a generally circular gear portion with gear teeth 134 on a circumferential surface that matingly engage with pawl teeth of the first and second pawls 116, 118, and a drive post or lug 132, which may be a drive square, extending from the gear portion. The gear teeth 134 of the drive gear 112 are disposed or received in the drive cavity 108, with the drive post or lug 132 projecting out of the drive cavity 108 (through the circular bore 130 of the cover plate 122). A detent mechanism 136 may also be incorporated into the drive post 132. The detent mechanism 136 may include a spring biased ball that provides for retention of sockets and other adapters that can be disposed on or coupled to the drive post 132.

The pawl carrier 114 is disposed or received in the pawl cavity 110. The pawl carrier 114 includes a rear side or side that faces away from the drive cavity 108 that includes first and second detent pockets 138, 140 and a projection 142 between the first and second detent pockets 138, 140. The first and second detent pockets 138, 140 are adapted to receive a detent mechanism that provided for positive indication of selection of the first and second rotational drive directions. The detent mechanism may include a ball 144 and spring 146 that are disposed in a bore 148 in a sidewall formed by the pawl cavity 110, such that the ball 144 is biased outwardly by the spring 146 at least partially into the pawl cavity 110. During operation, the pawl carrier 114 may be rotated via rotation of the reversing lever 120 to select either of the first and second rotational drive directions. For example, when the ball 144 is seated in the first detent pocket 138, the first rotational drive direction is selected; and when the ball 144 is seated in the second detent pocket 140, the second rotational drive direction is selected.

The pawl carrier 114 includes a front side or side that faces towards the drive cavity 108 that includes first and second pawl pockets 150, 152 and a projection 154 between the first and second pawl pockets 150, 152. The first and second pawl pockets 150, 152 are adapted to receive the respective first and second pawls 116, 118. The pawl carrier also includes first and second recessed ledges 156, 158, and first and second recesses or grooves 160, 162 that are proximate to the respective first and second pawl pockets 150, 152. The first and second recessed ledges 156, 158 have a thickness or height that is less than a thickness or height of a main body of the pawl carrier 114. The first and second recesses or grooves 160, 162 are adjacent to the respective first and second recessed ledges 156, 158, and provide for a portion of the main body of the pawl carrier 114 with a thickness or height that is less than the thickness or height of the first and second recessed ledges 156, 158.

The first and second pawls 116, 118 respectively include first and second pawl teeth 164, 166 on a first side of the pawls 116, 118 that are selectively engageable with the gear teeth 134. The first and second pawls 116, 118 also respectively include first and second rear sides 168, 170 opposite the pawl teeth 164, 166. The first and second pawls 116, 118 also respectively include first and second hook like projections 172, 174 with respective first and second protrusions 176, 178. The first and second hook like projections 172, 174 respectively extend outwardly from the first and second rear sides 168, 170 opposite the pawl teeth 164, 166. The respective first and second hook like projections 172, 174 may also be in a same plane formed by a top surface of the respective first and second pawls 116, 118. The first and second protrusions 176, 178 respectively extend downwardly from the first and second hook like projections 172, 174. For example, the first and second protrusions 176, 178 extend away from the cover plate 122, and towards the pawl carrier 114.

The first and second pawls 116, 118 are disposed or received in the pawl cavity 110, and are operably coupled to the pawl carrier 114. For example, the first pawl 116 is disposed in the pawl cavity 110 with the first rear side 168 disposed in the first pawl pocket 150 of the pawl carrier 114, the first hook like projection 172 extending over the first recessed ledge 156 of the pawl carrier 114, and the first protrusion 176 extending into the first groove 160 of the pawl carrier 114. Similarly, the second pawl 118 is disposed in the pawl cavity 110 with the second rear side 170 disposed in the second pawl pocket 152 of the pawl carrier 114, the second hook like projection 174 extending over the second recessed ledge 158 of the pawl carrier 114, and the second protrusion 178 extending into the second groove 162 of the pawl carrier 114. The engagement of the first protrusion 176 with the first groove 160, and the second protrusion 178 with the second groove 162 may also allow for rotation of the respective first and second pawls 116, 118 in the first and second pawl pockets 150, 152. This allows for the respective first and second pawls 116, 118 to maintain proper orientation when selectively engaging the drive gear 112.

The reversing lever 120 includes a lever portion 180 and a projection 182. The lever portion 180 may be disposed through an opening 184 in the head 102 and disposed on an external side of the head 102 to provide for manual operation to select a rotational drive direction by a user. The projection 182 engages a correspondingly shaped bore in the pawl carrier 114 to provide for co-rotation of the pawl carrier 114 with the reversing lever 120 for manual selection of either the first or second rotational drive direction.

During operation, the reversing lever 120 may be manually operated to cause selection of either of the first and second rotational drive directions. As shown in FIG. 2, the first rotational drive direction is selected. When the first rotational drive direction is selected, the first pawl teeth 164 of the first pawl 116 are engaged with the gear teeth 134. The ball 144 is also seated in the first detent pocket 138 of the pawl carrier 114. The engagement of the second protrusions 178 of the second pawl 118 with the second groove 162 of the pawl carrier 114 may also allow for rotation of the second pawl 118 within the second pawl pocket 152 to allow the second pawl 118 to maintain proper orientation for engaging the drive gear 112 when the second rotational direction is selected.

When the reversing lever 120 is moved or rotated from selection of the first rotational direction to cause selection of the second rotational drive direction, rotation of the reversing lever 120 causes rotation of the pawl carrier 114 to cause the projection 142 of the pawl carrier 114 to depress or move the ball 144 against the bias of the spring 146 to allow the projection 142 to move past the ball 144, and the ball 144 to engage the second detent pocket 140. The rotation of the pawl carrier 114 causes the first pawl 116 to be pulled or moved away from the drive gear 112 (via the engagement of the first protrusion 176 of the first pawl 116 with the first groove 160 of the pawl carrier 114) and the first pawl teeth 164 moved out of engagement with the gear teeth 134. The engagement of the first protrusions 176 of the first pawl 116 with the first groove 160 of the pawl carrier 114 may also allow for rotation of the first pawl 116 within the first pawl pocket 150 to allow the first pawl 116 to maintain proper orientation for engaging the drive gear 112 when the first rotational direction is selected again. The rotation of the pawl carrier 114 also causes the second pawl 118 to be pushed or moved towards the drive gear 112 (via the engagement of the second protrusion 178 of the second pawl 118 with the second groove 162 of the pawl carrier 114) and the second pawl teeth 166 moved into engagement with the gear teeth 134.

The engagement of the first and second protrusions 176, 178 of the respective first and second pawls 116, 118 with the respective first and second grooves 160, 162 of the pawl carrier 114 movement of the first and second pawls 116, 118 to cause selection of either the first and second rotational drive directions. The engagement also allows the non-engaging pawl (i.e., pawl that is not engaged with the drive gear) to maintain proper orientation for engaging the drive gear 112 when the non-engaging pawl is moved into engagement with the drive gear 112.

While the pawl mechanism is described with respect to a ratchet wrench, the pawl mechanism may also be incorporates into other ratcheting type wrenches, such as ratcheting box type wrenches, powered ratcheting tools, and the like.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A pawl mechanism for a ratchet tool having a drive gear with gear teeth, the pawl mechanism comprising:
- a pawl carrier including a first pawl pocket, a first groove, and a first recessed ledge disposed adjacent to the first groove; and
- a first pawl disposed in the first pawl pocket, and including first pawl teeth selectively engageable with the gear teeth to select a first rotational drive direction, the first pawl including a first projection extending away from the first pawl teeth and over the first recessed ledge, and a first protrusion extending from the first projection and into the first groove.

2. The pawl mechanism of claim 1, wherein the first recessed ledge has a thickness less than a thickness of a main body of the pawl carrier.

3. The pawl mechanism of claim 1, wherein the pawl carrier includes a second pawl pocket and second groove.

4. The pawl mechanism of claim 3, further comprising a second pawl disposed in the second pawl pocket, and including second pawl teeth selectively engageable with the gear teeth to select a second rotational drive direction, the second pawl including a second projection extending away from the second pawl teeth, and a second protrusion extending from the second projection and into the second groove.

5. The pawl mechanism of claim 4, wherein rotation of the pawl carrier from selection of the first rotational drive direction to selection of the second rotational drive direction causes the pawl carrier to move the first protrusion and first pawl away from the drive gear and the first pawl teeth out of engagement with the gear teeth, and the pawl carrier to move the second protrusion and second pawl towards the drive gear and the second pawl teeth into engagement with the gear teeth.

6. The pawl mechanism of claim 4, wherein the pawl carrier includes a second recessed ledge adjacent to the second groove, and the second projection extends over the second recessed ledge.

7. The pawl mechanism of claim 6, wherein the second recessed ledge has a thickness less than a thickness of a main body of the pawl carrier.

8. A ratchet tool, comprising:
- a ratchet head with a drive cavity and a pawl cavity;
- a drive gear disposed in the drive cavity, and including gear teeth;
- a pawl carrier disposed in the pawl cavity, and including first and second pawl pockets that face towards the drive gear, first and second grooves, a first recessed ledge disposed adjacent to the first groove, and a second recessed ledge disposed adjacent to the second groove;
- a reversing lever coupled to the pawl carrier, and movable to select either of first and second rotational drive directions;
- a first pawl disposed in the pawl cavity and in the first pawl pocket, and including first pawl teeth selectively engageable with the gear teeth when the first rotational drive direction is selected, the first pawl including a first projection extending away from the first pawl teeth and over the first recessed ledge, and a first protrusion extending from the first projection and into the first groove; and a second pawl disposed in the pawl cavity and in the second pawl pocket, and including second pawl teeth selectively engageable with the gear teeth when the second rotational drive direction is selected, the second pawl including a second projection extending away from the second pawl teeth and over the second recessed ledge, and a second protrusion extending from the second projection and into the second groove.

9. The ratchet tool of claim 8, wherein the first recessed ledge has a thickness less than a thickness of a main body of the pawl carrier.

10. The ratchet tool of claim 8, wherein the second recessed ledge has a thickness less than a thickness of a main body of the pawl carrier.

11. The ratchet tool of claim 8, wherein when the first rotational drive direction is selected, the first pawl teeth are engageable with the gear teeth, and the second pawl teeth are disposed away from the gear teeth.

12. The ratchet tool of claim 8, wherein when the second rotational drive direction is selected, the second pawl teeth are engageable with the gear teeth, and the first pawl teeth are disposed away from the gear teeth.

* * * * *